US011078379B2

(12) United States Patent
Pibre et al.

(10) Patent No.: US 11,078,379 B2
(45) Date of Patent: Aug. 3, 2021

(54) METHOD FOR THE PREVENTION OF MIST FORMATION IN A DEVICE COMPRISING ROLLS DURING THE COATING OF FLEXIBLE MEDIA WITH A CROSSLINKABLE LIQUID SILICONE COMPOSITION

(71) Applicants: ELKEM SILICONES FRANCE SAS, Lyons (FR); CENTRE NATIONAL DE LA RECHERCHE SCIENTIFIQUE, Paris (FR); INSTITUT NATIONAL DES SCIENCES APPLIQUÉES, Villeurbanne (FR); UNIVERSITE CLAUDE BERNARD LYON 1, Villeurbanne (FR); UNIVERSITÉ JEAN MONNET, Saint-Etienne (FR)

(72) Inventors: Guillaume Pibre, Lezoux (FR); Aymeric Genest, Oullins (FR); Stéphanie Benitou, Saint Cyr sur le Rhône (FR); Jean-Marc Frances, Meyzieu (FR); Etienne Fleury, Soucieu en Jarrest (FR); François Ganachaud, Decines (FR); Daniel Portinha De Almeida, Fontaines sur Saône (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 116 days.

(21) Appl. No.: 16/312,672

(22) PCT Filed: Jun. 20, 2017

(86) PCT No.: PCT/FR2017/000122
§ 371 (c)(1),
(2) Date: Dec. 21, 2018

(87) PCT Pub. No.: WO2017/220871
PCT Pub. Date: Dec. 28, 2017

(65) Prior Publication Data
US 2019/0249036 A1     Aug. 15, 2019

(30) Foreign Application Priority Data

Jun. 21, 2016   (FR) ................. FR16 00987

(51) Int. Cl.
| *C09D 183/08* | (2006.01) |
| *C09D 7/65* | (2018.01) |
| *C09D 5/00* | (2006.01) |
| *B62B 3/02* | (2006.01) |
| *C09D 183/06* | (2006.01) |
| *C08G 77/20* | (2006.01) |
| *C08G 77/388* | (2006.01) |
| *B62B 5/00* | (2006.01) |
| *C08G 77/26* | (2006.01) |
| *B05D 1/28* | (2006.01) |
| *C08G 77/00* | (2006.01) |

(52) U.S. Cl.
CPC ............. *C09D 183/08* (2013.01); *B62B 3/02* (2013.01); *C09D 5/00* (2013.01); *C09D 7/65* (2018.01); *C09D 183/06* (2013.01); *B05D 1/28* (2013.01); *B62B 5/0033* (2013.01); *B62B 2202/404* (2013.01); *C08G 77/20* (2013.01); *C08G 77/26* (2013.01); *C08G 77/388* (2013.01); *C08G 77/70* (2013.01)

(58) Field of Classification Search
USPC ..................................................... 427/428.1
See application file for complete search history.

(56) References Cited

U.S. PATENT DOCUMENTS

| 4,806,391 | A | 2/1989 | Shorin |
| 5,145,915 | A | 9/1992 | Weitemeyer et al. |
| 6,057,033 | A | 5/2000 | Bilodeau |
| 6,153,661 | A | 11/2000 | Castellanos et al. |
| 6,265,497 | B1* | 7/2001 | Herzig .............. C08G 77/485 |
| | | | 525/478 |
| 6,764,717 | B2* | 7/2004 | Herzig ................ C08G 77/50 |
| | | | 427/387 |
| 7,238,755 | B2* | 7/2007 | Herzig ................ C08G 77/50 |
| | | | 525/477 |
| 8,183,335 | B2 | 5/2012 | Maliverney et al. |
| 8,461,283 | B2 | 6/2013 | Maliverney et al. |
| 8,465,807 | B2 | 6/2013 | Maliverney |
| 8,475,873 | B2 | 7/2013 | Maliverney et al. |
| 8,729,209 | B2 | 5/2014 | Barrandon et al. |
| 8,835,590 | B2 | 9/2014 | Maliverney et al. |
| 8,871,889 | B2 | 10/2014 | Maliverney |
| 9,353,257 | B2 | 5/2016 | Frances et al. |
| 9,447,258 | B2 | 9/2016 | Maliverney et al. |
| 9,512,294 | B2 | 12/2016 | Maliverney et al. |

(Continued)

FOREIGN PATENT DOCUMENTS

| DE | 4009889 C1 | 6/1991 |
| EP | 0105341 A1 | 4/1984 |

(Continued)

OTHER PUBLICATIONS

International Search Report and Written Opinion dated Sep. 21, 2017 in corresponding International Patent Application No. PCT/FR2017/000122, filed Jun. 20, 2017, 20 pages.

*Primary Examiner* — Brian K Talbot
(74) *Attorney, Agent, or Firm* — Dentons US LLP

(57) ABSTRACT

Approaches are described for coating various flexible media, such as sheets of paper, synthetic polymer (polyolefin, polyester, etc.) sheets or fabric sheets, with a silicone on high-speed rolls. For example, an efficient method is described for minimizing and/or reducing mist formation when coating flexible supports with a liquid silicone composition precursor of crosslinked coatings. The coating process can be performed using a coating device that includes a roll operating at a high speed.

15 Claims, No Drawings

(56) References Cited

U.S. PATENT DOCUMENTS

| | | | |
|---|---|---|---|
| 9,624,251 B2 | 4/2017 | Baceiredo et al. | |
| 9,828,470 B2 | 11/2017 | Monteil et al. | |
| 9,938,304 B2 | 4/2018 | Baceiredo et al. | |
| 10,358,541 B2* | 7/2019 | Ganachaud | C08K 5/10 |
| 2005/0101679 A1* | 5/2005 | Lautenschlager | C08L 83/00 |
| | | | 516/1 |
| 2008/0276836 A1* | 11/2008 | Schlitzer | C09D 183/04 |
| | | | 106/287.14 |
| 2009/0208660 A1* | 8/2009 | Guennouni | C09D 183/04 |
| | | | 427/428.01 |
| 2009/0297719 A1* | 12/2009 | Magd | D06M 13/288 |
| | | | 427/428.01 |
| 2010/0298485 A1* | 11/2010 | Frey | C08G 77/50 |
| | | | 524/500 |
| 2017/0313729 A1 | 11/2017 | Baceiredo et al. | |
| 2018/0265668 A1 | 9/2018 | Ganachaud et al. | |
| 2018/0273690 A1 | 9/2018 | Monteil et al. | |

FOREIGN PATENT DOCUMENTS

| | | | |
|---|---|---|---|
| EP | 0355381 A1 | 2/1990 | |
| EP | 0396130 A2 | 11/1990 | |
| EP | 0562897 A1 | 9/1993 | |
| EP | 0716115 A2 | 6/1996 | |
| EP | 2222626 A1 | 9/2010 | |
| EP | 2222756 A1 | 9/2010 | |
| EP | 2222773 A1 | 9/2010 | |
| EP | 2268743 A2 | 1/2011 | |
| EP | 2367867 A1 | 9/2011 | |
| EP | 2443207 A1 | 4/2012 | |
| EP | 2443208 A1 | 4/2012 | |
| EP | 2904021 A1 | 8/2015 | |
| EP | 2935489 A1 | 10/2015 | |
| EP | 2935490 A1 | 10/2015 | |
| FR | 2110115 A5 | 5/1972 | |
| FR | 2526800 A1 | 11/1983 | |
| FR | 2894590 A1 | 6/2007 | |
| GB | 1323869 A | 7/1973 | |
| WO | 83/03418 A1 | 10/1983 | |
| WO | 2004/046248 A1 | 6/2004 | |
| WO | 2007/065921 A1 | 6/2007 | |
| WO | 2008/027494 A2 | 3/2008 | |
| WO | 2009/106718 A1 | 9/2009 | |
| WO | 2009/106724 A1 | 9/2009 | |
| WO | 2009/118307 A2 | 10/2009 | |
| WO | 2010/060877 A1 | 6/2010 | |
| WO | 2010/146249 A1 | 12/2010 | |
| WO | 2010/146250 A1 | 12/2010 | |
| WO | 2014/053231 A1 | 4/2014 | |
| WO | 2014/096566 A1 | 6/2014 | |
| WO | 2014/096567 A1 | 6/2014 | |
| WO | 2015/004396 A1 | 1/2015 | |
| WO | 2015/004397 A1 | 1/2015 | |
| WO | 2015/082837 A1 | 6/2015 | |
| WO | 2016/071652 A1 | 5/2016 | |
| WO | 2016/071654 A1 | 5/2016 | |
| WO | 2016/075414 A1 | 5/2016 | |
| WO | 2016071651 A1 | 5/2016 | |
| WO | 2016/102498 A1 | 6/2016 | |

\* cited by examiner

METHOD FOR THE PREVENTION OF MIST FORMATION IN A DEVICE COMPRISING ROLLS DURING THE COATING OF FLEXIBLE MEDIA WITH A CROSSLINKABLE LIQUID SILICONE COMPOSITION

CROSS-REFERENCE TO PRIOR APPLICATIONS

This application is a National Stage of PCT/FR2017/000122, filed Jun. 20, 2017, and designating the United States (published on Dec. 28, 2017, as WO 2017/220871A1), which claims foreign priority under 35 U.S.C. § 119 to French Patent Application No. FR 1600987, filed Jun. 21, 2016, each hereby expressly incorporated by reference in its entirety and each assigned to the assignee hereof.

The invention relates to the general field of coating various flexible media, such as sheets of paper or of synthetic polymer (polyolefin, polyester, etc.) or alternatively of textile, with silicone on high-speed rolls.

More specifically, the invention relates to the coating of flexible materials with liquid compositions comprising one or more organopolysiloxanes which are crosslinkable by polyaddition, by dehydrocondensation, by polycondensation, cationically or radically so as to form a protective film or coating having especially anti-adhesive and/or hydrophobic properties.

The flexible media may be papers, cardboards, plastics films, metal films or textiles. The applications of these media coated with silicone are, for example: food paper (cooking, packaging), adhesive labels and tape, belt conveyors, etc.

The coating of these flexible media with crosslinkable liquid silicones is carried out on coating devices which operate continuously and at very high speed. These devices comprise coating heads composed of a plurality of rolls, including especially a press roll and a coating roll, which is continuously supplied with crosslinkable liquid silicone composition by means of a series of rolls placed side by side. The strip of flexible medium travels at high speed between the press roll and the coating roll in order to be coated on at least one of its faces with a silicone film which is to crosslink by means of crosslinking means arranged downstream of the coating head. These crosslinking means may be, for example, heat transmitters, radiation (for example ultraviolet) transmitters or electron beam transmitters.

In the quest for productivity, the manufacturers of flexible media coated with anti-adhesive silicone require liquid silicone coating formulations which are adapted to increasingly higher linear running speeds of the strip of flexible media. The economic factor is obviously not insignificant in this search for new silicone formulations for high-speed coating.

However, high speeds on continuous coating machines are known to be synonymous with problems of transfer of the liquid silicone film from the coating roll to the moving strip of flexible medium. These transfer problems (splitting) manifest themselves especially in the formation of a mist or aerosol (misting or fogging) around the coating head and, more particularly, at the points of contact between the rotating rolls and/or between the coating roll and the flexible medium to be coated. The density of this mist or aerosol increases when the linear running speed and therefore the speed of rotation of the rolls increases.

This phenomenon results, firstly, in a loss of consumable material, and especially the deposit of droplets of coating liquid on the medium downstream (for example at the oven), which impairs the quality of the coating.

Furthermore, this undesirable formation of mist has damaging consequences in terms of industrial hygiene and the safety of the operators, who are exposed in the vicinity of the roll coating device to a high content of aerosol. This may prove to be toxic.

In addition, the mist causes rapid clogging of the roll coating device, resulting in maintenance constraints and premature wear.

In order to protect against the consequences of this mist, an evacuation system which allows said mist to be captured is generally arranged around the coating head.

In addition, the person skilled in the art knows a number of adjustments which can be made to the coating head in order to counteract this phenomenon. Some examples thereof are mentioned below:
  A. lower the speed at the expense of productivity;
  B. reduce the rate of deposition of silicone at the expense of the properties of the silicone-coated flexible medium that are to be obtained (appearance, coverage, anti-adhesion, mechanical properties);
  C. increase the difference between the tangential speed of the coating roll and the linear speed of the paper. However, beyond a certain differential, the homogeneity of the coated layer is greatly impaired. Moreover, this allows the density of the mist to be reduced, but not sufficiently to allow a significant increase in the coating speed;
  D. increase the pressure between the coating roll and the press roll; here too, within a certain limit and without eliminating the phenomenon of mist formation sufficiently.

Another approach for preventing mist formation in roll coating machines consists in acting on the formulation of the liquid silicone coating composition.

According to this approach, it is known to reduce the number-average degree of polymerization of the organopolysiloxanes of which the silicone coating liquid is composed and, consequently, to reduce the viscosity of the silicone coating bath in order to limit the density of the mist.

These known methods have a major disadvantage, which is that they modify considerably the properties, and especially the anti-adhesion, of the silicone-coated flexible medium which is to be obtained.

By way of illustration of this approach through the silicone formulation there may be mentioned international patent application WO 2004/046248, which describes the use of star-shaped silicone polymers as an anti-misting additive for coating applications on flexible media. The process for preparing these star-shaped silicone polymers consists in incompletely reacting (by hydrosilylation) an organopolysiloxane comprising reactive ≡SiH units with a long-chain olefin in order to obtain a partially substituted polyhydroorganosiloxane, which is subsequently reacted by hydrosilylation with a vinyl-containing silicone resin of the type MQ and a long-chain diolefin. It is clear that such compositions are relatively complex and therefore expensive to obtain. Moreover, they can still be improved in respect of the prevention of mist formation in silicone coating on rolls, at high speed.

European patent EP-0 716 115 describes a method for manufacturing a silicone coating composition, this composition being presented as allowing the mist density to be reduced. According to this method there is employed a polydimethylmethylhydrosiloxane with trimethylsilyl ends having a degree of polymerization equal to 12, as well as 0.01% of a polydimethylsiloxane substituted by perfluoroethylbutyl and methylvinyl functions, the ends of which are of the dimethylvinylsiloxyl type and which has a degree of polymerization equal to 300, as well as polypropylene glycol and optionally a stearic or oleic alcohol. This yields polydimethylsiloxanes functionalized by polyoxypropylene groups. These functionalized polydimethylsiloxanes are associated with other polydimethylsiloxanes that are functionalized, e.g. by hexenyl units, as well as with a platinum-based hydrosilylation catalyst to form silicone coating compositions which allow mist formation to be reduced. The functionalizing units may be hydrophobic radicals such as stearic or oleic acid radicals.

American U.S. Pat. No. 4,806,391 relates to silicone-based inks and varnishes, and more specifically to a method of applying such inks and varnishes to a substrate by means of a roll coating machine operating at high speed. This patent discloses especially compositions comprising polydimethylsiloxanes with vinyl ends having a viscosity at 25° C. of between 15,000 and 50,000 mPa·s. These liquid coating compositions also comprise a platinum-based catalyst and a rheology additive composed of silica having a high specific surface area, in particular fumed silica.

American U.S. Pat. No. 6,057,033 discloses silicone compositions which are to be coated onto flexible media to form, after cationic crosslinking under UV, an anti-adhesive coating. In addition to organopolysiloxanes, these compositions comprise cellulose fibers having an average length of between 15 and 100 μm and an average thickness of between 5 and 40 μm. The organopolysiloxanes employed are organopolysiloxanes functionalized by crosslinking groups of the acryloxy or methacryloxy type, permitting radical crosslinking under UV. The cellulose fibers incorporated into the composition make it possible to provide a solution to the technical problem of obtaining a crosslinked anti-adhesive silicone coating that is not brittle. The cellulose fibers are presented as bringing improvements in terms of the transfer of the silicone coating film to the medium, die-cutting resistance, mechanical properties (tensile strength and tear strength), fixing of the coating to the paper, reduction in the absorption of the coating liquid into the paper and, secondarily, reduction in mist formation. On this second point, U.S. Pat. No. 6,057,033 does not provide any quantitative assessment of the mist reduction brought about by the cellulose fibers. There is every reason to think that the reduction remains wholly insufficient.

In light of such prior art, one of the essential objects of the invention is to propose an efficient method for the prevention of mist formation during the coating of flexible media with a liquid silicone composition that is a precursor of crosslinked coatings, this coating being carried out by means of a roll coating device operating at high speed.

Another essential object of the invention is to propose an economical and simple method for the prevention of mist formation during the coating of flexible media with a silicone composition that is to be crosslinked, this coating being carried out in a roll coating device operating at high speed.

Another essential object of the invention is to provide a novel liquid silicone composition X that is a precursor of silicone coating(s), which composition exhibits only slight mist formation during high-speed coating on rolls while yielding crosslinked silicone coatings of very good quality, in particular in terms of attachment and adhesion to the medium, and having an anti-adhesion profile with very good stability over time.

Another essential object of the invention is to propose a method for the prevention of mist formation within the scope of the coating of flexible media, using a silicone composition which is crosslinkable to form anti-adhesive coatings, by means of a roll coating device.

All these objects, among others, are achieved by the present invention, which relates firstly to a method for the prevention of mist formation during the coating of flexible media, comprising the following steps I) and II):

I) preparing a liquid silicone composition X that is a precursor of silicone coating(s), comprising:
   at least one organopolysiloxane A crosslinkable by polyaddition, by dehydrocondensation, by polycondensation, cationically or radically,
   optionally at least one crosslinking organosilicon compound B,
   optionally at least one catalyst or photoinitiator C, the nature of which is chosen according to the type of reaction envisaged for said organopolysiloxane A,
   optionally at least one adhesion-modulating system K, and
   optionally at least one crosslinking inhibitor D; and II) coating said liquid silicone composition X onto a flexible medium by means of a roll coating device, said method being characterized in that in step I) there is added to said liquid silicone composition X an anti-misting additive E obtainable by reacting at a temperature of between 10° C. and 100° C.:
   at least one compound F chosen from the organic compounds comprising at least one alkene or alkyne function of which at least one of the substituents is an acid function, and the organic compounds comprising at least one acid function and at least one alkene or alkyne function of which at least one of the substituents is an electro-attractive group; and
   at least one chemical compound comprising at least one primary or secondary amine function.

The chemical compound comprising a primary or secondary amine function may be chosen from the organic compounds and the organosilicon compounds. The organic compounds comprising a primary or secondary amine function which can be used according to the invention may be chosen from the primary amines such as n-propylamine, n-isopropylamine, n-butylamine, n-benzylamine, n-hexylamine, n-cyclohexylamine, n-octylamine, n-(2-ethylhexyl)amine, n-(2-phenylethyl)amine, n-(3-methoxypropyl)amine, n-nonylamine, n-isononylamine, n-decylamine, n-dodecylamine, ethylenediamine and 1,3-diaminopropane and the secondary amines such as n,n-dipropylamine, n,n-diisopropylamine, n,n-dibutylamine, n,n-dihexylamine, n,n-dicyclohexylamine, n,n-di(2-methoxyethyl)amine, n,n-dioctylamine, n,n-di(2-ethylhexyl)amine, n,n-diisononylamine, n,n-di(tridecyl)amine, morpholine, piperidine, pyrrolidine, 2,2,6,6-tetramethylpiperidine, piperazine, n,n'-dimethylethylenediamine, n,n'-diethylethylenediamine and n,n'-diisopropylethylenediamine.

When it is an organosilicon compound, the organosilicon chemical compound comprising at least one primary or secondary amine function may be a silane or an organopolysiloxane. According to a preferred embodiment of the invention, the chemical compound comprising at least one primary or secondary amine function is preferably an organopolysiloxane O as defined hereinbelow.

Thus, according to a preferred embodiment, the present invention relates to a method for the prevention of mist formation during the coating of flexible media, comprising the following steps I) and II):

I) preparing a liquid silicone composition X that is a precursor of silicone coating(s), comprising:
  at least one organopolysiloxane A crosslinkable by polyaddition, by dehydrocondensation, by polycondensation, cationically or radically,
  optionally at least one crosslinking organosilicon compound B,
  optionally at least one catalyst or photoinitiator C, the nature of which is chosen according to the type of reaction envisaged for said organopolysiloxane A,
  optionally at least one adhesion-modulating system K, and
  optionally at least one crosslinking inhibitor D; and
II) coating said liquid silicone composition X onto a flexible medium by means of a roll coating device,
  said method being characterized in that in step I) there is added to said liquid silicone composition X an anti-misting additive E obtainable by reacting at a temperature of between 10° C. and 100° C.:
    at least one compound F chosen from the organic compounds comprising at least one alkene or alkyne function of which at least one of the substituents is an acid function, and the organic compounds comprising at least one acid function and at least one alkene or alkyne function of which at least one of the substituents is an electro-attractive group; and
    at least one organopolysiloxane O chosen from the organopolysiloxanes comprising siloxy units (I1) and (1.2) of the following formulae:

$$Y_a Z^1_b SiO_{\frac{4-(a+b)}{2}};\quad (I.1)$$

$$Z^2_c SiO_{\frac{4-c}{2}} \quad (I.2)$$

wherein:
a=1 or 2, b=0, 1 or 2 and a+b=1, 2 or 3
c=1, 2 or 3
the symbols Y, which may be identical or different, represent a functional group of formula (I.3):

$$-E^1-(NH-G)_h-(NH_2)_i \quad (I.3)$$

wherein:
h=0 or 1;
i=0 or 1;
h+i=1 or 2
$E^1$ represents a divalent aliphatic, cycloaliphatic or aromatic hydrocarbon radical containing from 1 to 30 carbon atoms; preferably aliphatic containing from 1 to 10 carbon atoms;
G, when present, represents an aliphatic hydrocarbon radical containing from 1 to 10 carbon atoms, which is monovalent when i=0 or divalent when i=1;
the symbols $Z^1$ and $Z^2$, which may be identical or different, represent a monovalent hydrocarbon radical having from 1 to 30 carbon atoms and optionally containing one or more unsaturated bonds and/or one or more fluorine atoms, a hydroxyl group, or a radical —$OR^1$ where $R^1$ represents a linear, cyclic or branched $C_1$-$C_{10}$ hydrocarbon radical, and preferably $Z^1$ and $Z^2$ represent a monovalent hydrocarbon group chosen from the group consisting of alkyl groups having from 1 to 8 carbon atoms, alkenyl groups having from 2 to 6 carbon atoms and aryl groups having from 6 to 12 carbon atoms optionally containing one or more fluorine atoms, a hydroxyl group, or a radical —$OR^1$ wherein $R^1$ represents a linear, cyclic or branched $C_1$-$C_{10}$ hydrocarbon radical, and yet more preferably chosen from the group consisting of a methyl, ethyl, propyl, 3,3,3-trifluoropropyl, vinyl, hydroxyl, ethoxyl, methoxyl, xylyl, tolyl and phenyl group; said organopolysiloxane O comprising, per molecule, at least one siloxy unit (I.1) carrying at least one functional group of formula (I.3).

According to a particular embodiment, the anti-misting additive E as described above is obtained at a reaction temperature of between 10 and 90° C., and yet more preferably between 10 and 75° C.

One of the advantages of this method is that it reduces mist formation considerably (up to a factor of 1000) in a system for coating flexible media with silicone compositions. It is to the credit of the inventors that they have selected particularly efficient anti-misting additives E. Without wishing to be limited to a scientific theory or to a mechanism, it appears that this property of the anti-misting additive E according to the invention is due to the nature of the reactions which are employed in order to obtain it. On the one hand, an Aza-Michael reaction is carried out between NH bonds carried by the organopolysiloxane O and alkene or alkyne functions of the compound F. On the other hand, since the compound F also comprises at least one acid function, the method of the invention also employs an acid-base reaction between the amine functions of the organopolysiloxane O and said acid functions of the compound F. These ionic bonds give the anti-misting additive E a supramolecular ionic structure and viscoelastic properties which can be used to prevent mist formation in a roll coating system operating at high speed. These viscoelastic properties may be characterized by a thready appearance of the anti-misting additive E. "Coating . . . at high speed" is understood as meaning speeds greater than or equal to 100 m/min, preferably greater than 300 m/min (e.g. between 500 and 1000 m/min).

The duration of the reaction between the compound F and the organopolysiloxane O depends on the nature of the reagents F and O and on the temperature. The person skilled in the art will know how to adjust it in order to obtain the reaction between the NH bonds carried by the organopolysiloxane O and the alkene or alkyne functions of the compound F. The progress of this reaction may be monitored by $^1$H NMR. By way of information, at 50° C. the duration of the reaction may be between a few hours and several days.

Another advantage of using this anti-misting additive E in the method according to the invention is the quality of the crosslinking by polymerization after coating onto the flexible media. Indeed, the evaluation of the quality of the crosslinking or of the level of crosslinking of a silicone coating is made by evaluating the oily nature of the surface of the coating by passing a finger over the coating as it leaves a coating machine, through a factory test: smear. Moreover, the crosslinking kinetics is wholly interesting as illustrated by the low levels of extractables obtained.

Another advantage of using this anti-misting additive E in the method according to the invention is that the properties of the crosslinked silicone coatings on the flexible media are not affected, in particular in terms of adhesion to the medium and anti-adhesion profile with good stability over time.

Within the scope of the present invention, an electro-attractive group in the definition of the compound F is understood as meaning a group which attracts electrons to it, that is to say an atom or group of atoms having an electronegativity greater than that of hydrogen, thus resulting in electron-depleted bonds. Thus, within the scope of the invention, the electro-attractive group depletes the alkene or alkyne functions of electrons. Among the electro-attractive groups there may be mentioned especially the functions ketone, acid, amide, phosphonate ester, phosphonic acid, sulfonic acid, sulfone, ester, thioester, the group $NO_2$, the group CN, etc.

Within the scope of the present application, acid function is understood as meaning especially the carboxylic acid, sulfonic acid and phosphonic acid functions. Thus and preferably, the compound F of the present invention is chosen from the organic compounds comprising at least one carbon-carbon double or triple bond of which at least one of the substituents is a carboxylic acid, sulfonic acid or phosphonic acid function, or the organic compounds comprising at least one acid function chosen from a carboxylic acid function, a sulfonic acid function or a phosphonic acid function and at least one carbon-carbon double or triple bond of which at least one of the substituents is an electro-attractive group. This compound F can then react in accordance with an Aza-Michael reaction with primary or secondary amines as described in the publication "Michael addition reactions in macromolecular design for emerging technologies" Progress in Polymer Science 31 (5), 487-531 (2006). Preferably, the compound F according to the invention comprises at least one carbon-carbon double bond of which at least one of the substituents is a carboxylic acid function or comprises at least one carboxylic acid function and at least one carbon-carbon double bond of which at least one of the substituents is an electro-attractive group. Yet more preferably, in the compound F according to the invention, at least one of the carbon-carbon double bonds and at least one of the acid functions are conjugate.

Among these compounds there may be mentioned preferably the compounds of formula (II):

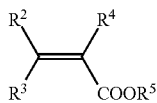
(II)

wherein:
$R^2$, $R^3$ and $R^4$, which may be identical or different, represent a hydrogen atom, a COOH group or a $C_1$ to $C_6$, preferably $C_1$ to $C_3$, alkyl group, preferably methyl;
$R^5$ represents a hydrogen atom, a $C_1$ to $C_6$ alkyl group or a $C_6$ to $C_{10}$ aryl group in which the alkyl and the aryl comprise at least one COOH group.

Preferably, in the compounds of formula (II), $R^2$ and $R^3$, which may be identical or different, represent a hydrogen atom or a $C_1$ to $C_6$, preferably $C_1$ to $C_3$, alkyl group, preferably methyl;
$R^4$ represents a hydrogen atom, a $C_1$ to $C_6$, preferably $C_1$ to $C_3$, alkyl group, preferably methyl, or a COOH group;
$R^5$ represents a hydrogen atom, a $C_1$ to $C_6$ alkyl group or a $C_6$ to $C_{10}$ aryl group in which the alkyl and the aryl comprise at least one COOH group.

Preferably, the compounds F of the invention are chosen from the group consisting of acrylic acid, methacrylic acid, itaconic acid, crotonic acid, 2-carboxyethyl acrylate, 3-carboxypropyl acrylate, maleic acid, fumaric acid, 2-(acryloyloxy)acetic acid, 2-(acryloyloxy)propanoic acid, 3-(acryloyl-oxy)propanoic acid, 2-(acryloyloxy)-2-phenylacetic acid, 4-(acryloyloxy)butanoic acid, 2-(acryloyloxy)-2-methylpropanoic acid, 5-(acryloyloxy)pentanoic acid, (E)-but-2-enoic acid, (Z)-prop-1-ene-1,2,3-tricarboxylic acid, cinnamic acid, sorbic acid, 2-hexenoic acid, 2-pentenoic acid, 2,4-pentadienoic acid, ethenesulfonic acid, vinylphosphonic acid, (1-phenylvinyl)phosphonic acid, 3-(vinylsulfonyl)propanoic acid, 2-(vinylsulfonyl)acetic acid, 2-(vinylsulfonyl)succinic acid, acetylenedicarboxylic acid and propiolic acid.

Preferably, the compounds F of the invention are chosen from acrylic acid, methacrylic acid, itaconic acid, crotonic acid, 2-carboxyethyl acrylate, 3-carboxypropyl acrylate, maleic acid and fumaric acid.

Preferably, the compound F is (meth)acrylic acid or 2-carboxyethyl acrylate. Yet more preferably, the compound F is acrylic acid.

The anti-misting additive E according to the invention is used in amounts which are sufficient to reduce the amount of misting during coating. Of course, the person skilled in the art, by means of routine tests, can determine those amounts without difficulty. Preferably, the anti-misting additive E according to the invention is used in an amount of greater than 1.5 parts by weight and preferably of between 2 and 15 parts by weight, based on the total weight of the liquid silicone composition X that is a precursor of silicone coating(s).

The organopolysiloxane O may have a linear, branched or cyclic structure. When the organopolysiloxanes are linear, they are composed substantially of siloxy units "D", especially chosen from the group consisting of the siloxy units $Y_2SiO_{2/2}$, $YZ^1SiO_{2/2}$ and $Z^2{}_2SiO_{2/2}$, and of siloxy units "M", especially chosen from the group consisting of the siloxy units $Y_3SiO_{1/2}$, $YZ^1{}_2SiO_{1/2}$, $Y_2Z^1SiO_{1/2}$ and $Z^2{}_3SiO_{1/2}$, Y, $Z^1$ and $Z^2$ being as defined hereinbefore, it being understood that the organopolysiloxane O comprises, per molecule, at least one siloxy unit carrying at least one functional group of formula (I.3) defined hereinbefore.

In a particularly preferred embodiment, the organopolysiloxane O is chosen from the organopolysiloxanes comprising siloxy units (I.1) and (I.2) of the following formulae:

(I.1)

(I.2)

wherein:
Y and $Z^1$ and $Z^2$ have the definitions given hereinbefore;
a=1 or 2, b=0, 1 or 2 and a+b=2 or 3
c=2 or 3.

Particularly preferably, the organopolysiloxane O is chosen from the organopolysiloxanes comprising units (I.1) chosen from the group consisting of $YZ^1SiO_{2/2}$ and $YZ^1{}_2SiO_{1/2}$ and units (I.2) chosen from the group consisting of $Z^2{}_2SiO_{2/2}$ and $Z^2{}_3SiO_{1/2}$, Y, $Z^1$ and $Z^2$ being as defined hereinbefore, it being understood that the organopolysiloxane O comprises, per molecule, at least one siloxy unit carrying at least one functional group of formula (I.3) defined hereinbefore.

Preferably, the organopolysiloxane O has a degree of polymerization of between 2 and 5000, preferably between 2 and 1500, more preferably between 2 and 500.

Preferably, the organopolysiloxane O comprises a number of siloxy units (I.1) of between 1 and 100, preferably between 2 and 80.

Preferably, the organopolysiloxane O comprises a quantity of NH bond/gram of between $1\times10^{-5}$ and $10\times10^{-2}$ mol/g, and preferably between $5\times10^{-5}$ and $5\times10^{-2}$ mol/g.

Preferably, the organopolysiloxane O may be chosen from the compounds of the following formulae (III), (IV), (V) and (VI):

(III)
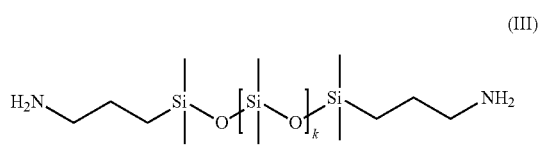

where k=from 1 to 1000, preferably from 1 to 800;

(IV)
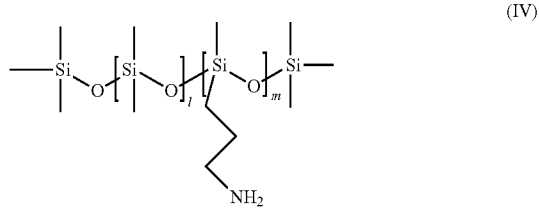

where l=from 1 to 1000, preferably from 1 to 800, and m=from 1 to 150, preferably from 1 to 100;

(V)
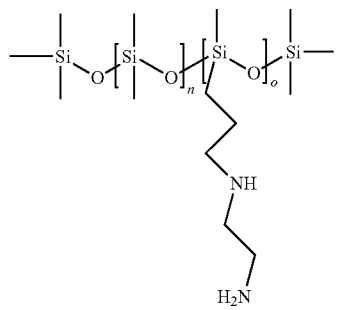

where n=from 1 to 1000, preferably from 1 to 800, and m=from 1 to 150, preferably from 1 to 100; and (VI)
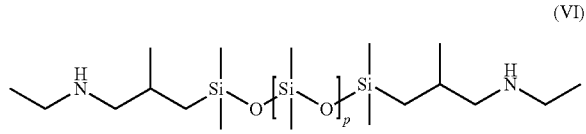

where p=from 1 to 1000, preferably from 1 to 800.

According to another embodiment, the organopolysiloxane O may be chosen from the compounds of formula (IV) and (V) as described hereinbefore having terminal dimethylmethoxysilyl units instead of trimethylsilyl.

In a particular embodiment, the organopolysiloxane O may be in emulsion.

All the preferred features defining the organopolysiloxane O may be combined with one another.

Generally, it is possible to define the ratio r representing the ratio between the number of moles of alkene or alkyne function of the compound F of which at least one of the substituents is an electro-attractive group or an acid function, preferably the number of moles of C=C double bond of which at least one of the substituents is an electro-attractive group or an acid function, and the number of moles of N—H bonds carried by the organopolysiloxane O. The ratio r corresponds to the following relationship:

$$r = \frac{n(\text{C=C, C}\equiv\text{C})}{n(\text{N-H})}$$

It is likewise possible to define the ratio J representing the ratio between the number of moles of acid functions of the compound F and the number of moles of amine functions of the organopolysiloxane O. The ratio J corresponds to the following relationship:

$$J = \frac{\text{number of moles of compound } F \times \text{number of acid functions of compound } F}{\text{number of moles of compound } O \times \text{number of amine functions of compound } O}$$

Amine function is intended to denote primary or secondary amines. It must therefore be understood that one mole of primary amine function contains two moles of NH bonds and that one mole of secondary amine function contains one mole of NH bonds.

Preferably, the ratio J is between 0.5 and 3, preferably between 0.5 and 1.5, and yet more preferably between 0.5 and 1.1.

Preferably, the ratio r is between 0.05 and 2, preferably between 0.2 and 1.5, and yet more preferably between 0.25 and 0.75.

Preferably, the organopolysiloxane O has a dynamic viscosity of between 1 and 100,000 mPa·s, preferably between 100 and 50,000 mPa·s. Yet more preferably, the organopolysiloxane O has a dynamic viscosity of between 5000 and 100,000 mPa·s.

All the viscosities mentioned in the present disclosure correspond to a value of dynamic viscosity at 25° C. called "Newtonian", that is to say the dynamic viscosity which is measured, in a manner known per se, using a Brookfield viscometer at a shear rate gradient which is sufficiently low that the measured viscosity is independent of the velocity gradient.

The anti-misting additive E may be a viscoelastic liquid or a viscoelastic solid. It may be referred to as a gel when the anti-misting additive E is at the transition between a viscoelastic liquid and solid. It is thus possible to obtain anti-misting additives E having viscoelastic properties which can be modulated.

As is described in the unpublished application PCT/EP2015/080843, the method for the preparation of the anti-misting additive E comprises the reaction between at least one compound F and at least one organopolysiloxane O as defined hereinbefore. According to a preferred embodiment, the reaction between at least one compound F and at least one organopolysiloxane O is carried out at atmospheric pressure under air but may also take place under an inert gas atmosphere, such as an argon or nitrogen atmosphere.

Preferably, the compound F and the organopolysiloxane O are brought into contact in the absence of a solvent (in bulk).

According to one embodiment of the invention, the compound F and the organopolysiloxane O are brought into contact in the presence of a solvent. The solvent is especially chosen from:

polar protic solvents, such as, for example, water, alcohols, ionic liquids;

non-polar solvents such as, for example, heptane, toluene, methylcyclohexane;

polar aprotic solvents such as ketones (for example acetone), ethers, esters, tetrahydrofuran (THF), dimethyl sulfoxide (DMSO), dimethylformamide (DMF).

According to a particular embodiment, the compound F and the organopolysiloxane O are brought into contact in the presence of a filler. Within the scope of the present invention, the fillers are preferably mineral fillers. They may especially be siliceous fillers. With regard to the siliceous materials, they may act as a reinforcing or semi-reinforcing filler. Reinforcing siliceous fillers are chosen from the colloidal silicas and the fumed and precipitated silica powders and mixtures thereof. These powders have a mean particle size which is generally less than 0.1 μm (micrometers) and a specific BET surface area greater than 30 m²/g, preferably between 30 and 350 m²/g. Semi-reinforcing siliceous fillers such as diatomaceous earths or ground quartz may likewise be employed. In a practical but non-limiting manner, the fillers employed may be a mixture of quartz and silica. The fillers may be treated by any appropriate product.

The filler may be introduced either directly mixed with the organopolysiloxane O or into the reaction mixture after mixing of the organopolysiloxane O and the compound F.

As regards weight, it is preferred to use an amount of filler of between 0.5% and 30% by weight and preferably between 0.5% and 10% by weight, based on the totality of constituents O and F.

According to a particular embodiment of the method according to the invention, in step I) the organopolysiloxane A of the liquid silicone composition X that is a precursor of silicone coating(s) is a radically crosslinkable organopolysiloxane. The organopolysiloxane A is then an organopolysiloxane A1 comprising meth(acrylate) and preferably acrylate functions. More specifically, the organopolysiloxane A1 comprises:

a1) at least one unit of the following formula (VII.1):

in which formula:

the symbols $R^6$, which may be identical or different, each represent a linear or branched $C_1$ to $C_{18}$ alkyl group, a $C_6$ to $C_{12}$ aryl or aralkyl group, optionally substituted, preferably by halogen atoms, or an alkoxy radical —$OR^7$ where $R^7$ is a hydrogen atom or a hydrocarbon radical containing from 1 to 10 carbon atoms, the symbols $Z^3$ are monovalent radicals of the formula -y-(Y')$_n$ wherein:

y represents a polyvalent linear or branched $C_1$-$C_{18}$ alkylene radical optionally extended by bivalent $C_1$ to $C_4$ oxyalkylene or polyoxyalkylene radicals and optionally substituted by a hydroxy radical, Y' represents a monovalent alkenylcarbonyloxy radical, and n is equal to 1, 2 or 3, and a is an integer equal to 0, 1 or 2, b is an integer equal to 1 or 2, and the sum a+b=1, 2 or 3; and a2) optionally units of the following formula (VII.2):

in which formula:

the symbols $R^8$, which may be identical or different, each represent a linear or branched $C_1$ to $C_{18}$ alkyl radical, a $C_6$ to $C_{12}$ aryl or aralkyl group, optionally substituted, preferably by halogen atoms, and a is an integer equal to 0, 1, 2 or 3.

According to this variant of the invention, the photoinitiator C employed in the composition X with the organopolysiloxane A1 is a radical photoinitiator C1 which may be chosen from the aromatic ketones which, following exposure under ultraviolet radiation (UV):

undergo homolytic cleavage at the α-position of the carbonyl function (such as for the acyl phosphonate derivatives, the acylphosphine oxide derivatives, the benzoin ether derivatives and the acetophenone derivatives) with formation of two radical fragments, one of which is a benzoyl radical (type I photoinitiators), or form free radicals when they are promoted into their excited states by removal of hydrogen from a hydrogen donor molecule (more commonly designated by the term "co-initiator"), which results in the formation of an inactive ketyl radical and an initiator radical obtained from the corresponding donor (type II photoinitiators).

Preferably, the radical photoinitiator C1 is chosen from the group consisting of the α-hydroxy ketones, the benzoin ethers, the aromatic α-amino ketones and the acylphosphine oxides. Preferably, the radical photoinitiator C1 is an acylphosphine oxide and more preferably the radical photoinitiator C1 is ethyl (2,4,6-trimethylbenzoyl)phenylphosphinate (CAS No. 84434-11-7).

According to another embodiment of the invention, in step I) the organopolysiloxane A of the liquid silicone composition X that is a precursor of silicone coating(s) is an organopolysiloxane crosslinkable by polyaddition. The organopolysiloxane A is then an organopolysiloxane A2 comprising at least two siloxy units of formula (VIII.1) with optionally at least a portion of the other units being siloxy units of formula (VIII.2)

in which formulae:

W is an alkenyl group, preferably vinyl or allyl, the symbols $Z^4$, which may be identical or different, represent:

a linear or branched alkyl radical containing from 1 to 20 carbon atoms, optionally substituted by at least one halogen, preferably fluorine, the alkyl radicals preferably being methyl, ethyl, propyl, octyl and 3,3,3-trifluoropropyl, a cycloalkyl radical containing between 5 and 8 cyclic carbon atoms, optionally substituted, an aryl radical containing between 6 and 12 carbon atoms, optionally substituted, and/or an aralkyl moiety having an alkyl moiety containing between 5 and 14 carbon atoms and an aryl moiety containing between 6 and 12 carbon atoms, optionally substituted on the aryl moiety by halogens and/or alkyls, a is 1 or 2, preferably equal to 1, b is 0, 1 or 2 and a+b=1, 2 or 3, and c=0, 1, 2 or 3.

Examples of organopolysiloxanes A2 crosslinkable by polyaddition are dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends.

According to this variant, the crosslinking organosilicon compound B is a compound B2 comprising at least three siloxy units of formula (IX.1) with optionally at least a portion of the other units being siloxy units of formula (IX.2):

$$HL_cSiO_{(3-c)/2} \quad (IX.1)$$

$$L_gSiO_{(4-g)/2} \quad (IX.2)$$

wherein:
H is a hydrogen atom,
the symbols L, which may be identical or different, represent:
  a linear or branched alkyl radical containing from 1 to 20 carbon atoms, optionally substituted by at least one halogen, preferably fluorine, the alkyl radicals preferably being methyl, ethyl, propyl, octyl and 3,3,3-trifluoropropyl,
  a cycloalkyl radical containing between 5 and 8 cyclic carbon atoms, optionally substituted,
  an aryl radical containing between 6 and 12 carbon atoms, optionally substituted, and/or
  an aralkyl moiety having an alkyl moiety containing between 5 and 14 carbon atoms and an aryl moiety containing between 6 and 12 carbon atoms, optionally substituted on the aryl moiety by halogens and/or alkyls,
$c=0$, 1 or 2, and
$g=0$, 1, 2 or 3.

Examples of the crosslinking organosilicon compound B2 are, for example:
  dimethylpolysiloxane polymers with hydrodimethylsilyl ends,
  poly(dimethylsiloxy)(methylhydrosiloxy) α,ω-dimethylhydrosiloxy polymers,
  $MOD^H$: copolymers having (dimethylsiloxy)(hydromethylsiloxy) units with trimethylsilyl ends,
  $M^HDD^H$: copolymers having (dimethylsiloxy)(hydromethylsiloxy) units with hydrodimethylsilyl ends,
  $MD^H$: hydromethylpolysiloxanes with trimethylsilyl ends, Still in accordance with this variant, the catalyst C is a polyaddition catalyst C2. The polyaddition catalyst C2 may be composed of at least one metal belonging to the platinum group. This catalyst may especially be chosen from the compounds of platinum and rhodium but also from the compounds of silicon such as those described in patent applications WO2015004396 and WO2015004397, the compounds of germanium such as those described in patent applications WO2016075414 or the complexes of nickel, cobalt or iron such as those described in patent applications WO2016071651, WO2016071652 and WO2016071654. The catalyst that is generally preferred is platinum. In this case, the amount by weight of the polyaddition catalyst C2, calculated by weight of platinum metal, is generally between 2 and 400 ppm.

According to another embodiment of the invention, in step I) the organopolysiloxane A of the liquid silicone composition X that is a precursor of silicone coating(s) is an organopolysiloxane crosslinkable by polycondensation. The organopolysiloxane A is then a linear or branched organopolysiloxane A3 carrying hydroxyl groups or hydrolyzable groups, for example alkoxy, which crosslink at ambient temperature by polycondensation reactions under the action of moisture, generally in the presence of a catalyst C3. The catalyst C3 is a catalyst of polycondensation reactions. The polycondensation catalysts are widely known to the person skilled in the art. Without implying any limitation, the catalyst C3 may be chosen inter alia from the tin-based compounds which are widely known to the person skilled in the art or from the organic catalysts such as the guanidines described in patent applications EP2268743 and EP2367867 or from the metal complexes, for example based on Zn, Mo, Mg, etc., described in patent applications EP2222626, EP2222756, EP2222773, EP2935489, EP2935490 and WO2015/082837. Still in accordance with this variant, the crosslinking organosilicon compound B is a compound B3 which is a compound carrying at least 3 hydrolyzable groups, preferably alkoxy groups, such as, for example, a silicate, an alkyl trialkoxysilane or an aminoalkyl trialkoxysilane.

According to another embodiment of the invention, in step I) the organopolysiloxane A of the liquid silicone composition X that is a precursor of silicone coating(s) is an organopolysiloxane crosslinkable by dehydrocondensation. The organopolysiloxane A is then a linear, branched or crosslinked organopolysiloxane A4 carrying hydroxyl groups. According to this variant, the crosslinking organosilicon compound B is a compound B4 which is a linear, branched or crosslinked organopolysiloxane carrying hydrosilyl or SiH groups. The dehydrocondensation reaction between the organopolysiloxane A4 and the crosslinker B4 takes place in the presence of a catalyst C4. Without implying any limitation, the catalyst C4 may be chosen from the metal compounds, for example based on platinum or iridium, or organic compounds, for example of the guanidine type as described in patent applications EP2443207 and EP2443208.

According to another embodiment of the invention, in step I) the organopolysiloxane A of the liquid silicone composition X that is a precursor of silicone coating(s) is a cationically crosslinkable organopolysiloxane. The organopolysiloxane A is then an organopolysiloxane A5 comprising at least one reactive function G chosen from the group consisting of the functions: epoxy, alkenyl ether, oxetane and dioxolane. These organopolysiloxanes A5 crosslink in the presence of an effective amount of a photoinitiator C which is a cationic photoinitiator C5 of the onium salt type by way of activation by actinic radiation (UV) or by electron beams. Preferably, the photoinitiator C5 is an iodonium borate, for example as described in documents EP-562897 and EP-2904021. A specific example is the following iodonium borate:

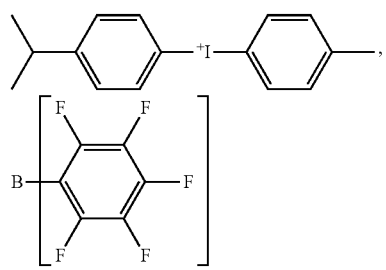

The organopolysiloxanes A5 which may be epoxy- or vinyloxy-functional organopolysiloxanes are described especially in patents DE-4 009 889, EP-0 396 130, EP-0 355 381, EP-0 105 341, FR-2 110 115, FR-2 526 800. The epoxy-functional organopolysiloxanes may be prepared by hydrosilylation reactions between oils having ≡SiH units and epoxy-functional compounds such as 1,2-epoxy-4-vinyl-4-cyclohexane (VCMX) or allyl glycidyl ether. The vinyloxy-functional organopolysiloxanes may be prepared by hydrosilylation reaction between oils having SiH units and vinyloxy-functional compounds such as allyl vinyl ether or allyl-vinyloxyethoxybenzene.

The crosslinking inhibitor D, when present, is generally used to confer on the ready-to-use composition a certain pot-life. These crosslinking inhibitors are especially present when in step I) the organopolysiloxane A of the liquid silicone composition X that is a precursor of silicone coating(s) is an organopolysiloxane crosslinkable by polyaddition or dehydrogenation and the catalyst C employed is based on platinum. The crosslinking inhibitor D is preferably chosen from the acetylenic alcohols (ethynylcyclohexanol: ECH), the diallyl maleates, the triallyl isocyanurates, the dialkyl maleates (diethyl maleates or dialkylalkynyl dicarboxylates) (diethyl acetylenedicarboxylate) or from the organopolysiloxanes, advantageously cyclic and substituted by at least one alkenyl, tetramethylvinylcyclotetrasiloxane being particularly preferred, or the alkylated maleates. The acetylenic alcohols are retarders which can be used according to the invention. There may be mentioned by way of example:

1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

In the liquid silicone composition X that is a precursor of silicone coating(s), it may be advantageous to employ at least one adhesion-modulating system K in order to allow the anti-adhesive properties of the crosslinked silicone coating to be controlled. By way of illustration, the adhesion-modulating system K may be:

in the case of a formulation which crosslinks by polyaddition: a polyorganosiloxane resin of formula $MD^{Vi}Q$; $MM^{Vi}Q$; $MM^{Vi}D^{Vi}Q$; $MM^{Vi}DD^{Vi}Q$; $MD^{H}Q$ or $MM^{H}Q$ (where Vi=vinyl group), in the case of a formulation which crosslinks by polycondensation or dehydrocondensation: a polyorganosiloxane resin of formula $M^{OH}Q$, and in the case of a formulation which crosslinks under radiation: a polyorganosiloxane resin of formula $MD^{H}Q$ or $MM^{H}Q$.

It is recalled that:

the symbol "D" denotes a siloxy unit of formula $(CH_3)_2 SiO_{2/2}$ the symbol "$D^{Vi}$" denotes a siloxy unit of formula $(CH_3)(vinyl)SiO_{2/2}$ the symbol "$D^{H}$" denotes a siloxy unit of formula $(CH_3)HSiO_{2/2}$ the symbol "M" denotes a siloxy unit of formula $(CH_3)_3 SiO_{1/2}$ the symbol "$M^{Vi}$" denotes a siloxy unit of formula $(CH_3)_2(vinyl)SiO_{1/2}$ the symbol "$M^{H}$" denotes a siloxy unit of formula $(CH_3)_2 HSiO_{1/2}$ the symbol "$M^{OH}$" denotes a siloxy unit of formula $(CH_3)_2(OH)SiO_{1/2}$ and the symbol "Q" denotes a siloxy unit of formula $SiO_{4/2}$.

According to a preferred variant of the method according to the invention, in step I) the liquid silicone composition X that is a precursor of silicone coating(s) to which the anti-misting additive E is added comprises:

at least one radically crosslinkable organopolysiloxane A1,
at least one radical photoinitiator C1; and
optionally at least one adhesion-modulating system K.

The organopolysiloxane A1 and the photoinitiator C1 are as defined hereinbefore.

According to a preferred variant of the method according to the invention, in step I) the liquid silicone composition X that is a precursor of silicone coating(s) to which the anti-misting additive E is added comprises:

at least one organopolysiloxane A2 crosslinkable by polyaddition,
at least one crosslinking organosilicon compound B2,
at least one catalyst C2,
optionally at least one adhesion-modulating system K, and
optionally at least one crosslinking inhibitor D.

The organopolysiloxane A2, the crosslinker B2, the catalyst C2, the adhesion-modulating system K and the crosslinking inhibitor D are as defined hereinbefore.

According to another variant of the method according to the invention, in step I) the liquid silicone composition X that is a precursor of silicone coating(s) to which the anti-misting additive E is added comprises:

at least one organopolysiloxane A3 crosslinkable by polycondensation,
at least one anti-misting additive E as described hereinbefore,
at least one crosslinking organosilicon compound B3,
at least one catalyst C3, and
optionally at least one adhesion-modulating system K.

The organopolysiloxane A3, the crosslinker B3, the catalyst C3 and the adhesion-modulating system K are as defined hereinbefore.

According to another variant of the method according to the invention, in step I) the liquid silicone composition X that is a precursor of silicone coating(s) to which the anti-misting additive E is added comprises:

at least one organopolysiloxane A4 crosslinkable by dehydrocondensation,
at least one crosslinking organosilicon compound B4,
at least one catalyst C4, and
optionally at least one adhesion-modulating system K, and
optionally at least one crosslinking inhibitor D.

The organopolysiloxane A4, the crosslinker B4, the catalyst C4, the adhesion-modulating system K and the crosslinking inhibitor D are as defined hereinbefore.

According to another variant of the method according to the invention, in step I) the liquid silicone composition X that is a precursor of silicone coating(s) to which the anti-misting additive E is added comprises:

at least one cationically crosslinkable organopolysiloxane A5,
at least one photoinitiator C5, and
optionally at least one adhesion-modulating system K.

The organopolysiloxane A5, the photoinitiator C5 and the adhesion-modulating system K are as defined hereinbefore.

In addition to these constituents, the liquid silicone composition X that is a precursor of silicone coating(s) may also comprise at least one additive conventional in silicone compositions which crosslink by polyaddition, by polycondensation, by dehydrocondensation, cationically or radically. There may be mentioned, for example, pigments and fillers P. The fillers P are preferably mineral fillers. Such fillers may be in the form of very finely divided products; these fillers include fumed silicas and precipitated silicas: their specific surface area is, for example, equal to or greater than 40 m$^2$/g and is most frequently in the range 40-300 m$^2$/g. These fillers P may also be in the form of more coarsely divided products, with a mean particle diameter of, for example, greater than 1 µm.

As examples of such fillers there may be mentioned ground quartz, diatomaceous silicas, iron oxides, magnesium oxides, zinc oxides, and the various forms of alumina (hydrated or non-hydrated); their specific surface area is, for example, equal to or less than 30 m$^2$/g. The fillers P may have been surface-modified by treatment with the various organosilicon compounds that are conventionally employed for that purpose. Thus, these organosilicon compounds may be organochlorosilanes, diorganocyclopolysiloxanes, hexaorganodisiloxanes, hexaorganodisilazanes or diorganocyclopolysilazanes. The treated fillers contain, in most cases, from 2 to 20% by weight organosilicon compounds.

The invention relates also to a liquid silicone composition X that is a precursor of silicone coating(s), comprising:
  at least one organopolysiloxane A crosslinkable by polyaddition, by dehydrocondensation, by polycondensation, cationically or radically,
  at least one anti-misting additive E as described hereinbefore,
  optionally at least one crosslinking organosilicon compound B,
  optionally at least one catalyst or photoinitiator C, the nature of which is chosen according to the type of reaction envisaged for said organopolysiloxane A,
  optionally at least one adhesion-modulating system K, and
  optionally at least one crosslinking inhibitor D.

According to a variant of the invention, the liquid silicone composition X that is a precursor of silicone coating(s) comprises:
  at least one radically crosslinkable organopolysiloxane A1,
  at least one anti-misting additive E as described hereinbefore,
  at least one radical photoinitiator C1; and
  optionally at least one adhesion-modulating system K.

The organopolysiloxane A1, the anti-misting additive E, the photoinitiator C1 and the adhesion-modulating system K are as defined hereinbefore.

According to another variant of the invention, the liquid silicone composition X that is a precursor of silicone coating(s) comprises:
  at least one organopolysiloxane A2 crosslinkable by polyaddition,
  at least one anti-misting additive E as described hereinbefore,
  at least one crosslinking organosilicon compound B2,
  at least one catalyst C2,
  optionally at least one adhesion-modulating system K, and
  optionally at least one crosslinking inhibitor D.

The organopolysiloxane A2, the anti-misting additive E, the crosslinker B2, the catalyst C2, the adhesion-modulating system K and the crosslinking inhibitor D are as defined hereinbefore.

According to another preferred embodiment, the liquid silicone composition X that is a precursor of silicone coating(s) comprises:
  at least one organopolysiloxane A3 crosslinkable by polycondensation,
  at least one anti-misting additive E as described hereinbefore,
  at least one crosslinking organosilicon compound B3,
  at least one catalyst C3, and
  optionally at least one adhesion-modulating system K.

The organopolysiloxane A3, the anti-misting additive E, the crosslinker B3, the catalyst C3 and the adhesion-modulating system K are as defined hereinbefore.

According to another preferred embodiment, the liquid silicone composition X that is a precursor of silicone coating(s) comprises:
  at least one organopolysiloxane A4 crosslinkable by dehydrocondensation,
  at least one anti-misting additive E as described hereinbefore,
  at least one crosslinking organosilicon compound B4,
  at least one catalyst C4,
  optionally at least one adhesion-modulating system K, and
  optionally at least one crosslinking inhibitor D.

The organopolysiloxane A4, the anti-misting additive E, the crosslinker B4, the catalyst C4, the adhesion-modulating system K and the crosslinking inhibitor D are as defined hereinbefore.

According to another preferred embodiment, the liquid silicone composition X that is a precursor of silicone coating(s) comprises:
  at least one cationically crosslinkable organopolysiloxane A5,
  at least one anti-misting additive E as described hereinbefore,
  at least one photoinitiator C5, and
  optionally at least one adhesion-modulating system K.

The organopolysiloxane A5, the anti-misting additive E, the photoinitiator C5 and the adhesion-modulating system K are as defined hereinbefore.

Finally, the invention relates to the use of the anti-misting additive E as defined hereinbefore for reducing mist formation during the coating of flexible media with a liquid silicone composition X that is a precursor of silicone coating(s).

It appears, therefore, that the invention proposes an original, simple, economical and reliable means of preventing the production of mist during the coating of flexible media (for example of paper, synthetic polymer (polyolefin, polyester, etc.) or alternatively of textile) in roll coating devices operating at high speed. The practical industrial consequence is that the running speeds can be increased without the occurrence of the phenomenon of misting, which is detrimental to the quality of the coating. The means of prevention proposed by the invention also has the not insignificant advantage that it does not impair the quality of appearance, the coverage, the anti-adhesive properties or the mechanical properties (rub-off) of the crosslinked silicone coating which is to be obtained on at least one of the faces of the flexible medium.

In addition, the reduction of mist significantly improves the hygiene and safety conditions for personnel working close to industrial silicone roll coating devices operating at high speed.

The examples which follow serve to illustrate particular embodiments of the invention without limiting the scope of the invention to these single embodiments.

EXAMPLES

I) Preparation of the Anti-Misting Additives E:

In the examples below, which are given by way of illustration, reference is made to the following definitions:

Mn represents the number-average molar mass.

The organopolysiloxanes employed in the examples have the following formula:

$$H_2N \sim Si(O-Si)_a O-Si \sim NH_2 \quad (III)$$

organopolysiloxane (3): compound of formula (III), Mn 3000 g/mol, quantity of N—H bond per gram=$1.33 \times 10^{-3}$ mol/g;

organopolysiloxane (4): compound of formula (III), Mn 50,000 g/mol, quantity of N—H bond per gram=$8.0 \times 10^{-5}$ mol/g;

organopolysiloxane (5): compound of formula (III), Mn 30,000 g/mol; quantity of N—H bond per gram=$1.33 \times 10^{-4}$ mol/g.

Example 1

Preparation of an Anti-Misting Additive E1 According to the Invention

In a 25 mL single-neck flask, 10.0 g of PDMS (5) and 0.039 g of acrylic acid are mixed, resulting in a molar ratio r=0.63 and a molar ratio J=1.26. The reaction mixture is stirred magnetically for 7 days at a temperature of 50° C. No post-reaction treatment was applied. $^1$H NMR analysis of the product obtained in $CDCl_3$ at 27° C. (128 scans) showed that the acrylic functions had disappeared.

Example 2

Preparation of an Anti-Misting Additive E2 According to the Invention

In a 25 mL single-neck flask, 13.48 g of organopolysiloxane (4) and 0.022 g of acrylic acid are mixed, resulting in a molar ratio r=0.52 and a molar ratio J=1.03. The reaction mixture is stirred magnetically for 8 days at a temperature of 50° C. No post-reaction treatment was applied. $^1$H NMR analysis of the product obtained in $CDCl_3$ at 27° C. (128 scans) showed that the acrylic functions had disappeared.

Example 3

Preparation of an Anti-Misting Additive E3 According to the Invention

In a 25 mL single-neck flask, 10.01 g of organopolysiloxane (3) and 0.461 g of acrylic acid are mixed, resulting in a molar ratio r=0.5 and a molar ratio J=0.99. The reaction mixture is stirred magnetically for 7 days at a temperature of 50° C. No post-reaction treatment was applied. $^1$H NMR analysis of the product obtained in $CDCl_3$ at 27° C. (128 scans) showed that the acrylic functions had disappeared.

Example 4

Preparation of an Anti-Misting Additive E4 According to the Invention

In a two-neck flask, hexylamine and acrylic acid are mixed in proportions such that the acrylic acid/primary amine ratio is equal to 1. The mixture is stirred for 24 hours at a temperature of 50° C.

The products E1, E2 and E3 obtained all have a viscosity which is at least 10 times greater than that of the respective starting organopolysiloxanes. The products obtained may be described as viscoelastic liquids.

In products E2 and E3, all the acid and amine functions are in ionic form (ammonium carboxylate) because the ratio J is equal to 1. In the case of compound E2, the ratio J=1.26 and consequently 25% of the acid functions will be in COOH form and not in ionic form.

II) Test as Anti-Misting Additive

The anti-misting additives E1 to E4 prepared in part I) were tested for anti-misting use.

Description of the Test

In order to analyze and quantify the mist produced in a roll coating device operating at high speed there was employed on the laboratory scale a "pilot misting machine" with a nephelometer (Portable Dust Monitor Series 1.100 from GRIMM), which allows the particles having a size greater than 0.5 μm, that is to say all the particles emitted into the atmosphere, to be measured.

The coating device (supplied by Ermap, France) comprises 2 rollers and allows a strip of paper to run at a linear speed of from 50 to 920 m/min. The two press/coating rolls have a diameter of 10 cm. The press roll is covered with rubber and the coating roll is covered with chromium. The coating roll was shaped like a dumbbell so that the speed of the two rolls is synchronous. The press roll, which can be driven by a motor, is in contact with the coating roll under constant pressure. The silicone coating liquid is poured directly into the gap between the two rollers. The amount of fluid used is 0.25 ml.

The nephelometer measures the concentration of particles in the mist or aerosol, expressed in $\mu g/m^3$.

The anti-misting performances of the various additives were tested in a radically crosslinkable silicone composition composed of 95 parts of compound A1 and 5 parts of compound A2, both having the following formula:

$$(CH_3)_3Si-O-\left[\begin{array}{c}CH_3\\|\\Si-O\\|\\CH_3\end{array}\right]_p \left[\begin{array}{c}CH_3\\|\\Si-O\\|\\\end{array}\right]_q Si(CH_3)_3$$

with pendant group: —O—CH$_2$—CH(OH)—CH$_2$—O—C(=O)—CH=CH$_2$ where for A1 (p=85 and q=7.5) and for A2 (p=220 and q=3.8), and one part ethyl (2,4,6-trimethylbenzoyl)phenylphosphinate (CAS No. 84434-11-7) as photoinitiator.

To the composition described above there is added zero, one or three parts by weight of the anti-misting additives E1 to E4 prepared in part I). The mixture is stirred in order to homogenize it.

The results of the measurement of the mist density are expressed in $\mu g/m^3$ and are shown in Table 1 below:

TABLE 1

Measurement of mist density in $\mu g/m^3$

| Speed m/min | Without additive | E1 1 part | E2 1 part | E3 1 part | E1 3 parts | E2 3 parts | E3 3 parts | E4 3 parts |
|---|---|---|---|---|---|---|---|---|
| 60 | 570 | 77 | 24 | n.d.* | 26 | 77 | 42 | 23 |
| 200 | 9560 | 2062 | 2163 | 5523 | 146 | 378 | 176 | 54 |
| 400 | 37696 | 3494 | 3867 | 25751 | 247 | 360 | 240 | 105 |
| 600 | 55074 | 3136 | 7828 | 23088 | 570 | 787 | 520 | 122 |
| 800 | n.d.* | n.d.* | n.d.* | n.d.* | 1335 | 2316 | 1043 | 155 |
| 920 | n.d.* | n.d.* | n.d.* | n.d.* | 2407 | 3868 | 1400 | 135 |

*n.d. not measured.

Products E1, E2, E3 or E4 have very advantageous anti-mist behavior in the silicone compositions. With one part by weight of additive in the composition, mist is greatly reduced. With 3 parts by weight, the results are excellent.

Products E1 and E2 have the advantage of being more readily incorporated than compound E3 into the tested formulation by simple stirring.

II) Preparation of an Anti-Adhesive Silicone Coating on a Polymer Medium

The silicone compositions comprising three parts by weight of additive E1 or E2 are coated by means of a Rotomec pilot coating machine onto a polyester medium. The machine speed is 50 m/min with a mercury lamp power fixed at 100 W/cm in order to effect crosslinking under UV. The deposit is between 0.9 and 1.1 $g/m^2$. At the machine outlet, the tests carried out are smear, rub-off, dewetting and measurement of silicone extractables.

Tests Carried Out on the Media Coated with Anti-Adhesive Silicone Coatings:

Smear: Qualitative check of surface polymerization by the finger trace method, which consists in:
  arranging the sample of silicone-coated medium to be checked on a flat, rigid surface;
  making a trace with the fingertip by pressing moderately but firmly; and
  examining the trace so made with the naked eye, preferably in low-angled light. It is thus possible to see the presence of even a very slight trace from the difference in the shine of the surface.

The evaluation is qualitative. The smear is quantified using the following grading:
  A: very good, no trace with the finger
  B: slightly less good, trace scarcely visible
  C: marked trace
  D: very marked trace and oily appearance of the surface, product scarcely polymerized, that is to say a grade from A to D, from the best result to the worst.

Rub-off: Check of the ability of the silicone to adhere to the flexible medium by rubbing the finger to and fro, which consists in:
  arranging the sample of silicone-coated medium to be checked on a flat, rigid surface, the silicone being on the upper face;
  moving the fingertip to and fro 10 times (over a length of about 10 cm), pressing moderately but firmly;
  examining the appearance of rub-off with the naked eye. Rub-off corresponds to the appearance of a fine white powder or of tiny pellets which roll beneath the finger.

The evaluation is qualitative. Rub-off is quantified using the following grading:
  10: very good, no rub-off has occurred after 10 to-and-fro movements
  1: very poor, rub-off after the very first movement The grade corresponds to the number of the to-and-fro movement (from 1 to 10) after which rub-off occurs.

That is to say, a grade from 1 to 10, from the worst to the best result.

Dewetting: Assessment of the degree of polymerization of the silicone layer by evaluating silicone transfer to an adhesive brought into contact with the coating by means of an ink of standardized surface tension. The method is as follows:
  Select an approximately 20×5 cm sample of the silicone-coated paper to be characterized, taken in the running direction (machine direction).
  Cut a length of adhesive tape of 15 cm and then arrange it with the adhesive side on the paper to be tested, without creasing, by exerting pressure 10 times by sliding the finger over the length of the adhesive tape. ("Scotch" adhesive tape from 3 M, reference 610, width: 25 mm).
  Remove the adhesive tape and lay it flat, adhesive part up.
  Deposit an ink mark on the adhesive part of the tape using a cotton swab (for single use) over a length of about 10 cm (inks of the SHERMAN or FERARINI and BENELI brand, of surface tension 30 dynes/cm and viscosity 2 to 4 mPa/s). Start the stopwatch immediately.
  The phase of the phenomenon of dewetting is deemed to be entered when the ink mark changes appearance, then stop the stopwatch.
  The ink must be deposited on the adhesive part of the tape within 2 minutes following coating with silicone.
  If the result obtained is <10 seconds, it is considered that migration of silicone onto the adhesive has taken place and that polymerization is incomplete.
  A grade of from 0 to 10 will be given, corresponding to the time which passes, in seconds, before the phenomenon of dewetting is observed.
  If the result obtained is 10 seconds, polymerization is deemed to be complete. In this case, a grade of 10 will be given, meaning that the result is very good.
  Note the grade obtained and the ink used (name, brand, surface tension, viscosity).

Extractables: Measurement of the amount of silicone that is not grafted onto the network formed during polymerization. These silicones are extracted from the film by immersing the sample in MIBK for a minimum of 24 hours as soon as it leaves the machine. Measurement is carried out by flame absorption spectroscopy.

The results of the various factory tests are shown in the following table.

TABLE 2

Results of the factory tests on the coatings

| Formulation | Without additive | 3 parts additive E1 | 3 parts additive E2 |
|---|---|---|---|
| XRF coatweight ($g/m^2$) | 0.95 | 1.02 | 1.02 |
| Smear | A | A | B |
| Rub-off | 10 | 10 | 10 |

TABLE 2-continued

Results of the factory tests on the coatings

| Formulation | Without additive | 3 parts additive E1 | 3 parts additive E2 |
|---|---|---|---|
| Dewetting | 10 | 10 | 10 |
| Extractables In-Line (100 cm$^2$) % | 1.2 | 1.4 | 1.3 |

The factory tests of the two formulations comprising 3 parts of anti-misting additives E1 or E2 are satisfactory. There is no degradation of the properties of the coating obtained.

Release: Measurements of peel forces were carried out using the standardized adhesives TESA 4651. The specimens of the multilayer article (adhesive in contact with silicone surface) were stored for 1 day at 23° C., 1 day at 70° C. and 7 days at 70° C. under the required pressure conditions and were then tested at a low peel speed in accordance with the FINAT 3 test (FTM 3) known to the person skilled in the art.

The release force is expressed in cN/inch and is measured by means of a dynamometer, after compression of the samples either at ambient temperature (23° C.) or at a higher temperature for accelerated aging tests (generally 70° C.).

The results are recorded in Table 3 below:

TABLE 3

Release force in cN/inch

| Formulation | Without additive | 3 parts additive E1 | 3 parts additive E2 |
|---|---|---|---|
| TESA 7475 | | | |
| 1 d @ 23° C. | 9 | 11 | 11 |
| 1 d @ 70° C. | 10 | 14 | 13 |
| 7 d @70° C. | 12 | 17 | 17 |

The invention claimed is:

1. A method of minimizing mist formation during the coating of flexible media, the method comprising the following steps I) and II):
   I) preparing a liquid silicone composition X that is a precursor of silicone coating(s), the liquid silicone composition X comprising:
      at least one organopolysiloxane A crosslinkable by polyaddition, by dehydrocondensation, by polycondensation, cationically or radically,
      optionally at least one crosslinking organosilicon compound B,
      optionally at least one catalyst or photoinitiator C, the nature of which is chosen according to the type of reaction envisaged for said organopolysiloxane A,
      optionally at least one adhesion-modulating system K, and
      optionally at least one crosslinking inhibitor D; and
   II) coating said liquid silicone composition X onto a flexible medium by means of a roll coating device,
wherein in step I) an anti-misting additive E is added to said liquid silicone composition X and wherein the anti-misting additive E is obtained by reacting, at a temperature of from 10° C. to 100° C., at least one compound F and at least one chemical compound comprising at least one primary or secondary amine function, wherein:
   each compound F is an organic compound comprising at least one alkene or alkyne function of which at least one of the substituents is an acid function, and the organic compound comprises at least one acid function and at least one alkene or alkyne function of which at least one of the substituents is an electro-attractive group.

2. The method according to claim 1,
wherein the anti-misting additive E is obtained by reacting, at a temperature of from 10° C. to 100° C., at least one compound F and at least one organopolysiloxane O, wherein:
   each compound F is an organic compound comprising at least one alkene or alkyne function of which at least one of the substituents is an acid function, and the organic compound comprises at least one acid function and at least one alkene or alkyne function of which at least one of the substituents is an electro-attractive group; and
   each organopolysiloxane O is an organopolysiloxane comprising siloxy units (I.1) and (I.2) of the following formulae:

$$Y_a Z_b^1 SiO_{\frac{4-(a+b)}{2}}; \quad (I.1)$$

$$Z_c^2 SiO_{\frac{4-c}{2}} \quad (I.2)$$

wherein:
   a=1 or 2, b=0, 1 or 2 and a+b=1, 2 or 3;
   c=1, 2 or 3;
   each Y independently represents a functional group of formula (I.3):

$$-E^1-(NH-G)_h(NH_2)_i \quad (I.3)$$

wherein:
   h=0 or 1;
   i=0 or 1;
   h+i=1 or 2;
   $E^1$ represents a divalent aliphatic, cycloaliphatic or aromatic hydrocarbon radical containing from 1 to 30 carbon atoms;
   G, when present, represents an aliphatic hydrocarbon radical containing from 1 to 10 carbon atoms, which is monovalent when i=0 or divalent when i=1; and
   the symbols $Z^1$ and $Z^2$, which are identical or different, represent a monovalent hydrocarbon radical having from 1 to 30 carbon atoms and optionally containing one or more unsaturated bonds and/or one or more fluorine atoms, a hydroxyl group, or a radical $—OR^1$ wherein $R^1$ represents a linear, cyclic or branched $C_1$-$C_{10}$ hydrocarbon radical,
each organopolysiloxane O comprising, per molecule, at least one siloxy unit (I.1) carrying at least one functional group of formula (I.3).

3. The method according to claim 1, wherein each compound F is an organic compound comprising at least one carbon-carbon double bond and at least one carboxylic acid function.

4. The method according to claim 1, wherein each compound F is a compound of formula (II)

wherein:

R², R³ and R⁴, which are identical or different, represent a hydrogen atom, a COOH group, or a $C_1$ to $C_6$ alkyl group; and R⁵ represents a hydrogen atom, an alkyl group comprising at least one COOH group, or an aryl group comprising at least one COOH group.

5. The method according to claim 1, wherein each compound F is selected from the group consisting of acrylic acid, methacrylic acid, itaconic acid, crotonic acid, 2-carboxyethyl acrylate, 3-carboxypropyl acrylate, maleic acid, fumaric acid, 2-(acryloyloxy)acetic acid, 2-(acryloyloxy)propanoic acid, 3-(acryloyloxy)propanoic acid, 2-(acryloyloxy)-2-phenylacetic acid, 4-(acryloyloxy)butanoic acid, 2-(acryloyloxy)-2-methylpropanoic acid, 5-(acryloyloxy)pentanoic acid, (E)-but-2-enoic acid, (Z)-prop-1-ene-1,2,3-tricarboxylic acid, cinnamic acid, sorbic acid, 2-hexenoic acid, 2-pentenoic acid, 2,4-pentadienoic acid, ethenesulfonic acid, vinylphosphonic acid, (1-phenylvinyl)phosphonic acid, 3-(vinylsulfonyl)propanoic acid, 2-(vinylsulfonyl)acetic acid, 2-(vinylsulfonyl)succinic acid, acetylenedicarboxylic acid and propiolic acid.

6. The method according to claim 2, wherein each organopolysiloxane O is an organopolysiloxane comprising siloxy units (I.1) and (I.2) of the following formulae:

$$Y_a Z^1_b SiO_{\frac{4-(a+b)}{2}}; \quad (I.1)$$

$$Z^2_c SiO_{\frac{4-c}{2}} \quad (I.2)$$

wherein:
a=1 or 2, b=0, 1 or 2 and a+b=2 or 3; and
c=2 or 3.

7. The method according to claim 1, wherein said liquid silicone composition X comprises:
at least one radically crosslinkable organopolysiloxane A1;
at least one radical photoinitiator C1; and
optionally at least one adhesion-modulating system K.

8. A liquid silicone composition X that is a precursor of silicone coating(s), the liquid silicone composition X comprising:
at least one organopolysiloxane A crosslinkable by polyaddition, by dehydrocondensation, by polycondensation, cationically or radically,
at least one anti-misting additive E,
optionally at least one crosslinking organosilicon compound B,
optionally at least one catalyst or photoinitiator C, the nature of which is chosen according to the type of reaction envisaged for said organopolysiloxane A,
optionally at least one adhesion-modulating system K, and
optionally at least one crosslinking inhibitor D,
wherein the anti-misting additive E is obtained by reacting, at a temperature of from 10° C. to 100° C., at least one compound F and at least one chemical compound comprising at least one primary or secondary amine function, wherein:

each compound F is an organic compound comprising at least one alkene or alkyne function of which at least one of the substituents is an acid function, and the organic compound comprises at least one acid function and at least one alkene or alkyne function of which at least one of the substituents is an electro-attractive group.

9. The liquid silicone composition X according to claim 8, wherein said silicone composition X comprises:
at least one radically crosslinkable organopolysiloxane A1,
optionally at least one radical photoinitiator C1, and
optionally at least one adhesion-modulating system K.

10. A silicone coating exhibiting minimized misting, wherein the coating is formed with an anti-misting additive E in an amount effective to reduce mist formation when the coating is applied to a surface of a flexible medium, and wherein the coating is formed using a liquid silicone composition X that is a precursor of the silicone coating the liquid silicone composition X comprising:
at least one organopolysiloxane A crosslinkable by polyaddition, dehydrocondensation, by polycondensation, canonically or radically,
the anti-misting additive E,
optionally at least one crosslinking organosilicon compound B,
optionally at least one catalyst or photoinitiator C, the nature of which is chosen according to the type of reaction envisaged for said organopolysiloxane A,
optionally at least one adhesion-modulating system K, and
optionally at least one crosslinking inhibitor D;
wherein the anti-misting additive E is obtained by reacting, at a temperature of from 10° C. to 100° C., at least one compound F and at least one chemical compound comprising at least one primary or secondary amine function, wherein:
each compound F is an organic compound comprising at least one alkene or alkyne function of which at least one of the substituents is an acid function, and the organic compound comprises at least one acid function and at least one alkene or alkyne function of which at least one of the substituents is an electro-attractive group.

11. The method according to claim 2, wherein E1 is aliphatic and contains 1 to 10 carbon atoms.

12. The method according to claim 2, wherein $Z^1$ and $Z^2$ represent a monovalent hydrocarbon group selected from the group consisting of alkyl groups having from 1 to 8 carbon atoms, alkenyl groups having from 2 to 6 carbon atoms and aryl groups having from 6 to 12 carbon atoms optionally containing one or more fluorine atoms, a hydroxyl group, or a radical —$OR^1$ wherein $R^1$ represents a linear, cyclic or branched $C_1$-$C_{10}$ hydrocarbon radical.

13. The method according to claim 12, wherein $Z^1$ and $Z^2$ are selected from the group consisting of methyl, ethyl, propyl, 3,3,3-trifluoropropyl, vinyl, hydroxyl, methoxyl, xylyl, tolyl and phenyl group.

14. The method according to claim 4, wherein R², R³ and R⁴ are identical or different and represent a $C_1$ to $C_3$ alkyl group.

15. The method according to claim 14, wherein R², R³ and R⁴ are methyl.

* * * * *